US010402669B2

(12) United States Patent
Um

(10) Patent No.: US 10,402,669 B2
(45) Date of Patent: Sep. 3, 2019

(54) IRIS RECOGNITION CAMERA SYSTEM, TERMINAL COMPRISING SAME, AND IRIS RECOGNITION METHOD OF SYSTEM

(71) Applicant: LG Innotek Co., Ltd., Seoul (KR)

(72) Inventor: Kee Tae Um, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 175 days.

(21) Appl. No.: 15/527,642

(22) PCT Filed: Nov. 17, 2015

(86) PCT No.: PCT/KR2015/012290
§ 371 (c)(1),
(2) Date: May 17, 2017

(87) PCT Pub. No.: WO2016/080716
PCT Pub. Date: May 26, 2016

(65) Prior Publication Data
US 2017/0337442 A1    Nov. 23, 2017

(30) Foreign Application Priority Data
Nov. 17, 2014  (KR) .................. 10-2014-0159810

(51) Int. Cl.
*G06K 9/00* (2006.01)
*G06T 7/73* (2017.01)
*H04N 5/225* (2006.01)

(52) U.S. Cl.
CPC ..... *G06K 9/00919* (2013.01); *G06K 9/00604* (2013.01); *G06K 9/00617* (2013.01);
(Continued)

(58) Field of Classification Search
CPC ........... G06K 9/00919; G06K 9/00617; G06K 9/00604; H04N 5/2256; H04N 5/2254; G06T 7/74; G06T 2207/30201
(Continued)

(56) References Cited

U.S. PATENT DOCUMENTS 7,377,643 B1 * 5/2008 Chock .................. A61B 3/14
351/205
2002/0130961 A1 9/2002 Lee et al.
(Continued)

FOREIGN PATENT DOCUMENTS

JP       2002153445 A    5/2002
KR       100842501 B1    7/2008
(Continued)

OTHER PUBLICATIONS

International Search Report in International Application No. PCT/KR2015/012290, filed Nov. 17, 2015.

*Primary Examiner* — Marnie A Matt
(74) *Attorney, Agent, or Firm* — Saliwanchik, Lloyd & Eisenschenk

(57) ABSTRACT

An iris recognition camera system is provided to include: an image acquirer having an image sensor; at least one display arranged outside of the imaging unit; an analyzer for analyzing the position of an iris image taken, which has been generated by the image acquirer, in the image sensor; and a controller for controlling the operation of the at least one display in response to a result value which has been output from the analyzer. As a result, the iris recognition camera system can easily inform a user of the position of the iris image taken, enabling more rapid and accurate recognition of iris.

14 Claims, 8 Drawing Sheets

(52) U.S. Cl.
CPC ............. *G06T 7/74* (2017.01); *H04N 5/2256* (2013.01); *G06T 2207/30201* (2013.01); *H04N 5/2254* (2013.01)

(58) Field of Classification Search
USPC ........................................................ 348/161
See application file for complete search history.

(56) References Cited

U.S. PATENT DOCUMENTS

| | | | |
|---|---|---|---|
| 2004/0151491 A1* | 8/2004 | Coleman | G03B 13/02 396/376 |
| 2006/0093192 A1* | 5/2006 | Bechtel | G06K 9/00013 382/126 |
| 2006/0210118 A1 | 9/2006 | Kobayashi et al. | |
| 2008/0069411 A1* | 3/2008 | Friedman | G06K 9/00255 382/118 |
| 2012/0242820 A1* | 9/2012 | Hanna | G06K 9/00221 348/78 |
| 2012/0293642 A1* | 11/2012 | Berini | G06F 21/32 348/77 |
| 2013/0162798 A1 | 6/2013 | Hanna et al. | |
| 2014/0193045 A1* | 7/2014 | Otis | G06K 9/00597 382/117 |
| 2015/0269419 A1* | 9/2015 | Bae | G06K 9/00604 382/117 |
| 2015/0347844 A1* | 12/2015 | Min | G06K 9/00604 382/106 |
| 2016/0151117 A1* | 6/2016 | Gibbs | A61B 19/5244 600/424 |
| 2016/0275348 A1* | 9/2016 | Slaby | G06K 9/00604 |
| 2016/0335495 A1* | 11/2016 | Kim | G06K 9/00248 |
| 2017/0277950 A1* | 9/2017 | Sung | G06K 9/00 |

FOREIGN PATENT DOCUMENTS

| | | |
|---|---|---|
| KR | 100877807 B1 | 1/2009 |
| KR | 20120068655 A | 6/2012 |
| KR | 20140043109 A | 4/2014 |

* cited by examiner

IRIS RECOGNITION CAMERA SYSTEM, TERMINAL COMPRISING SAME, AND IRIS RECOGNITION METHOD OF SYSTEM

CROSS-REFERENCE TO RELATED APPLICATIONS

This application is the U.S. national stage application of International Patent Application No. PCT/KR2015/012290, filed Nov. 17, 2015, which claims priority to Korean Application No. 10-2014-0159810, filed Nov. 17, 2014, the disclosures of each of which are incorporated herein by reference in their entirety.

TECHNICAL FIELD

Embodiments relate to an iris recognition camera system, a terminal including the system, and an iris recognition method using the system.

BACKGROUND ART

An iris recognition system, which has higher security and accuracy than other authentication means, is used in identification and authentication for secure entry. An iris recognition system is a system that extracts characteristic iris patterns from iris images, taken by a camera, using an image processing technique, stores the extracted iris patterns as data, and compares the stored iris patterns with iris data of users registered in advance to authenticate a specific person.

In recent years, such an iris recognition system has been applied to mobile devices such that the mobile devices can be increasingly used as personal security systems.

In the iris recognition system, however, the iris must be accurately recognized at the center of a lens of the camera in order to perform rapid and accurate security authentication.

When a conventional iris recognition camera is used, however, it is not possible for a user to check whether his/her eye is located in the central area of the lens. Even in the case in which it is possible for the user to check whether his/her eye is located in the central area of the lens through a display unit of a mobile device, the position of the iris may be changed when the user views the display unit in order to check the position of the iris, whereby the accuracy of iris recognition may be reduced.

DISCLOSURE

Technical Problem

Embodiments provide an iris recognition camera system including an indication unit for indicating the relative position of a photographed iris image, a terminal including the iris recognition camera system, and an iris recognition method using the iris recognition camera system.

Technical Solution

In one embodiment, an iris recognition camera system includes an image pickup unit including an image sensor, at least one indication unit disposed around the image pickup unit, a calculation unit for analyzing the position of a photographed iris image generated by the image pickup unit on the image sensor, and a controller for controlling driving of the at least one indication unit based on a result value output from the calculation unit.

The at least one indication unit may include a plurality of indication units, and each of the indication units may include at least one light emitting module.

The indication units may be disposed above, under, on the left side of, and on the right side of the image pickup unit so as to surround the image pickup unit. The indication units that are disposed above and under the image pickup unit may be symmetrical with each other with respect to the image pickup unit, and the indication units that are disposed on the left and right sides of the image pickup unit may be symmetrical with each other with respect to the image pickup unit.

The at least one indication unit may include a plurality of light emitting modules, and the light emitting modules may be disposed above, under, on the left side of, and on the right side of the image pickup unit so as to surround the image pickup unit.

Each of light emitting modules may have a separate driving unit.

The iris recognition camera system may include an image extraction unit for extracting an authenticated iris image, and may further include a memory unit for storing a reference iris image.

In another embodiment, an iris recognition method using the iris recognition camera system according to the embodiment described above includes generating a photographed iris image, analyzing the position of the photographed iris image on the image sensor, and driving the indication unit based on a result value of the analyzed position of the photographed iris image.

The step of analyzing the position of the photographed iris image on the image sensor may include determining whether the photographed iris image is formed in a reference zone of the image sensor.

The reference zone may be an imaginary optical field zone including the center of the image sensor.

In the embodiment of the iris recognition method, the step of driving the indication unit in the case in which the photographed iris image deviates from the reference zone may include indicating the movement direction of the iris.

The iris recognition method may include extracting the photographed iris image as the authenticated iris image in the case in which the photographed iris image is located in the reference zone.

The iris center of the photographed iris image may be aligned with the center of the image sensor in the case in which the photographed iris image is located in the reference zone.

In addition, the iris recognition method may include comparing the authenticated iris image with the reference iris image.

In addition, the step of driving the indication unit may include driving the at least one indication unit so as to blink.

In a further embodiment, a terminal includes the iris recognition camera system according to the embodiment described above. The mobile terminal may further include an infrared light emitting module.

Advantageous Effects

An iris recognition camera system and an iris recognition method using the same according to embodiments are capable of easily indicating the relative position of an iris photographed by an image pickup unit through an indication unit disposed around the image pickup unit and acquiring an accurate iris image using the same, thereby achieving rapid iris recognition.

BEST MODE

Figure 1:
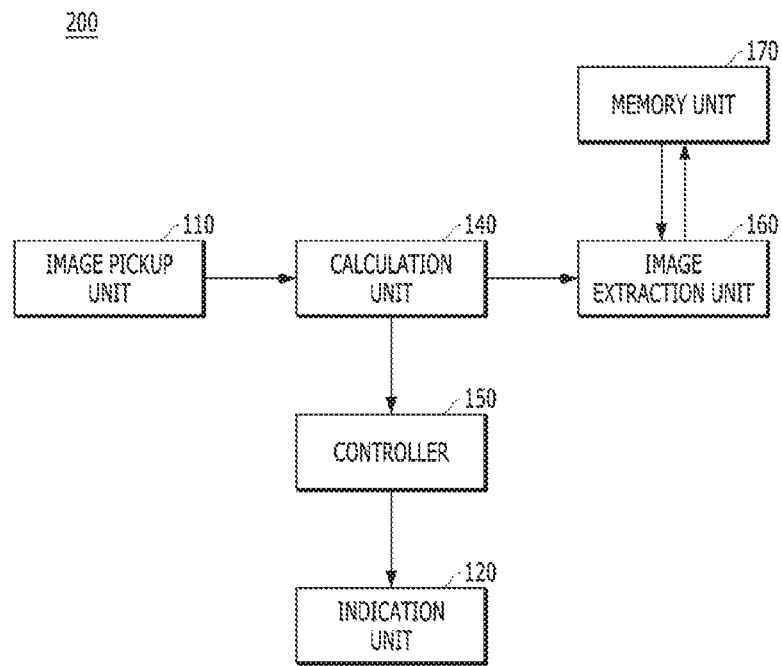
FIG. 1 is a block diagram showing an iris recognition camera system according to an embodiment.

Reference will now be made in detail to the preferred embodiments, examples of which are illustrated in the accompanying drawings.

Relational terms, such as "first," "second," "above," and "below," may be used only to distinguish between one subject or element and another subject or element without necessarily requiring or involving any physical or logical relationship or sequence between such subjects or elements.

In the drawings, the thickness or size of each constituent element may be exaggerated, omitted, or schematically illustrated for convenience of description and clarity. In addition, the size or area of each constituent element does not entirely reflect the actual size thereof.

FIG. 1 is a block diagram showing the schematic construction of an iris recognition camera system according to an embodiment.

An iris recognition camera system 200 shown in FIG. 1 may include an image pickup unit 110, an indication unit 120, a calculation unit 140, a controller 150, an image extraction unit 160, and a memory unit 170.

The image pickup unit 110 may include an image sensor.

Figure 2:
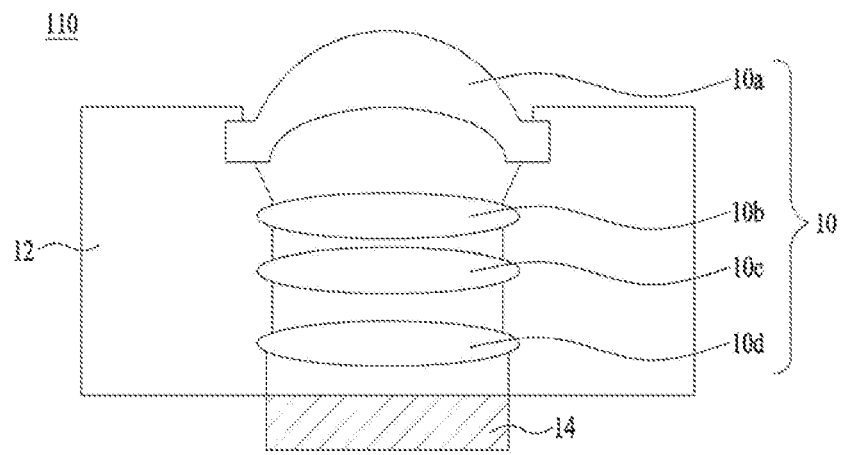
FIG. 2 is a view showing an embodiment of an image pickup unit.

FIG. 2 is a view showing an embodiment of the image pickup unit 110.

Referring to FIG. 2, the image pickup unit 110 may include an optical unit 10 for outputting optical information about a photographed iris and an image sensor 14 for converting the output optical information into an electrical signal.

The optical unit 10 may include a plurality of lenses 10*a*, 110*b*, 10*c*, and 10*d*. The optical unit 10 may output light incident thereupon from the outside to the image sensor 14 in order to acquire an image of a subject.

That is, in the image pickup unit 110, optical information of an acquired iris is output from the optical unit 10, which includes the lenses, to the image sensor 14, in which the optical information is converted into an electrical signal, whereby a photographed iris image may be generated.

In FIG. 2, four lenses 10*a* to 10*d* are disposed in a lens holder 12. However, the number of lenses constituting the optical unit 10 is not limited thereto. The optical unit 10 may include a single lens or a plurality of lenses.

The lenses 10*a* to 10*d* may be sequentially stacked, and spacers (not shown) may be disposed between the lenses 10*a* to 10*d*. The lenses 10*a* to 10*d* may be spaced apart from each other by the spacers such that the lenses 10*a* to 10*d* are arranged at intervals.

The lens holder 12 may have a cylindrical or quadrangular shape. However, the disclosure is not limited thereto.

In addition, at least one of the lenses 10*a* to 10*d* included in the optical unit 10 may condense light on the image sensor 14.

The lenses 10*a* to 10*d* may receive a large amount of light from a point of a subject and may refract the incident light such that the received light is collected on a point.

The light collected on a point forms a single image. In the case in which the light is collected on a point of the image sensor 14 to form a single image, the subject may be located at the focal distance of the lenses.

Optical information output from the optical unit 10 may be transmitted to the image sensor 14.

The image sensor 14 may convert the optical information of the subject, incident through the lenses of the optical unit 10, into an electrical signal. The image sensor 14 may be a charge-coupled device (CCD) sensor or a complementary metal-oxide-semiconductor (CMOS) sensor.

The image pickup unit 110 according to the embodiment may include a lens having a fixed focal distance. However, the disclosure is not limited thereto. The image pickup unit 110 may have an auto focusing function.

The iris recognition camera system 200 according to the embodiment may include an indication unit 120. At least one indication unit 120 may be disposed around the image pickup unit 110 so as to surround the image pickup unit 110.

Figure 3:
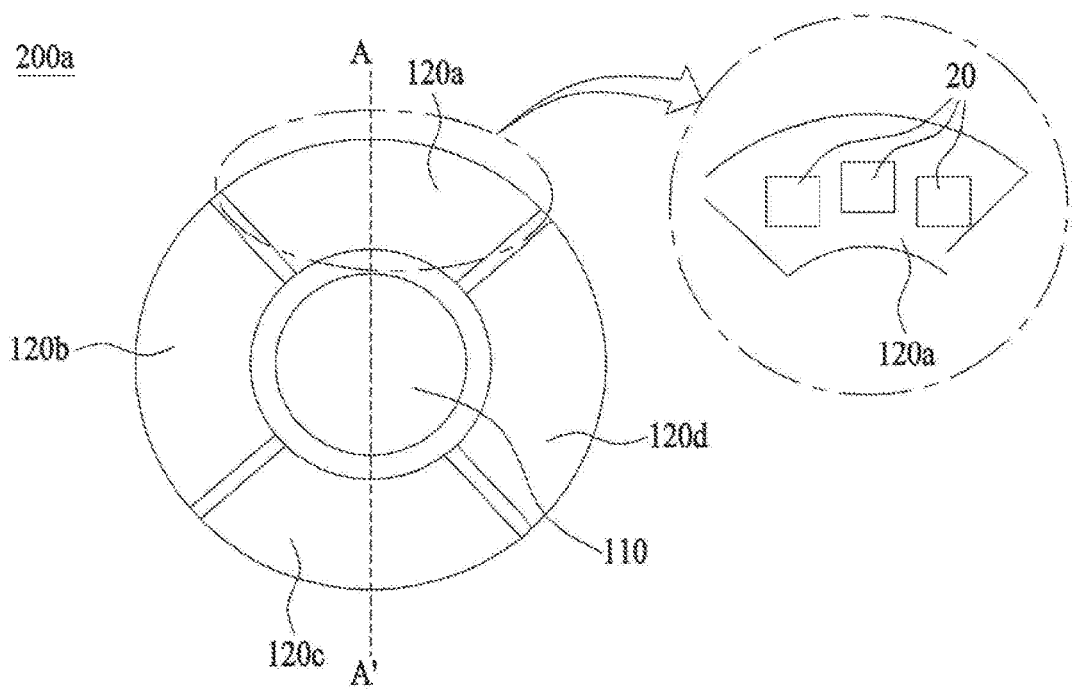
FIGS. 3 and 4 are views showing an embodiment of the iris recognition camera system.

FIG. 3 is a view showing an embodiment of the iris recognition camera system. FIG. 3 is a front view schematically showing an iris recognition camera system 200*a*.

Referring to FIG. 3, an image pickup unit 110 may be disposed at the center of the iris recognition camera system 200*a*, and a plurality of indication units 120*a*, 120*b*, 120*c*, and 120*d* may be disposed around the image pickup unit 110 so as to surround the image pickup unit 110.

The indication units 120*a* to 120*d* may be arranged at intervals. However, the disclosure is not limited thereto. The indication units 120*a* to 120*d* may be adjacent to each other.

For example, in the embodiment of the iris recognition camera system 200*a* of FIG. 3, four indication units 120*a* to 120*d* may be disposed around the image pickup unit 110, and the indication units 120*a* to 120*d* may be disposed above, under, on the left side of, and on the right side of the image pickup unit 110, respectively.

When the indication units are disposed above, under, on the left side of, and on the right side of the image pickup unit 110, the indication units 120*a* and 120*c*, which are disposed above and under the image pickup unit 110, respectively, may be disposed so as to be opposite each other on the basis of the image pickup unit 110.

In addition, the indication units 120*b* and 120*d*, which are disposed on the left and right sides of the image pickup unit 110, respectively, may also be disposed so as to be opposite each other on the basis of the image pickup unit 110.

In the embodiment of FIG. 3, the indication units 120*a* to 120*d* are shown as being disposed above, under, on the left side of, and on the right side of the image pickup unit 110, respectively. However, the disclosure is not limited thereto. The indication units may be disposed diagonally so as to surround the image pickup unit 110.

Even in the case in which the indication units are disposed diagonally, two of the indication units that are opposite each other may be disposed so as to be symmetrical with each other with respect to the image pickup unit 110.

In addition, four indication units 120a to 120d are shown as being disposed in FIG. 3. However, the number of indication units is not limited thereto. For example, four or more indication units may be disposed so as to surround the image pickup unit 110.

Each of the indication units 120a to 120d may include at least one light emitting module 20.

That is, each of the indication units 120a to 120d may include one or more light emitting modules 20.

Each indication unit may include a plurality of light emitting modules 20 that emit beams having the same wavelength. Alternatively, each indication unit may include a plurality of light emitting modules that emit beams having different wavelengths.

Each of the indication units 120a to 120d may have a separate driving unit, and each indication unit may emit beams having different wavelengths.

Figure 4:
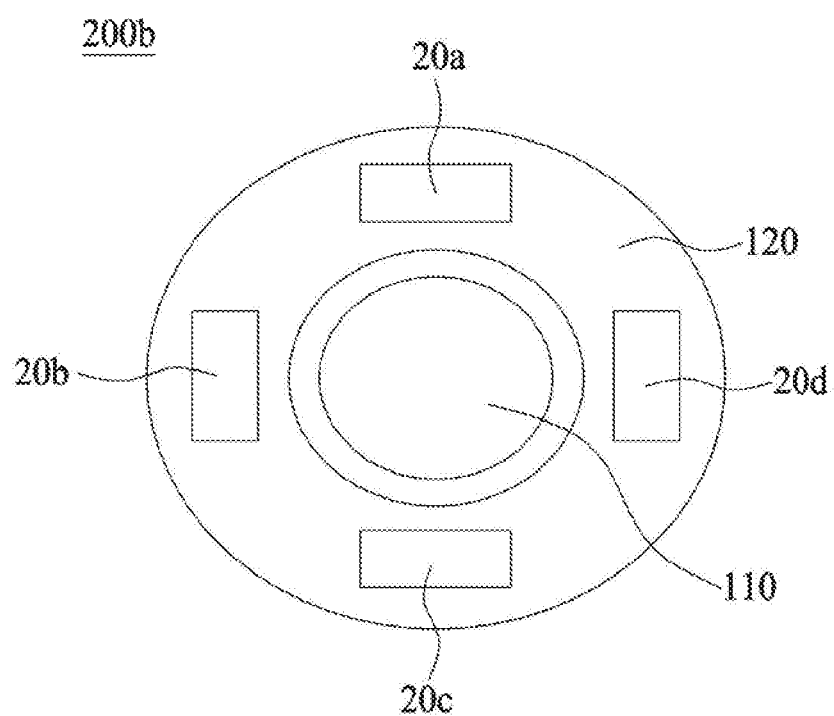

FIG. 4 is a view showing another embodiment of the iris recognition camera system.

FIG. 4 is a front view schematically showing an iris recognition camera system 200b. The iris recognition camera system 200b according to the embodiment may include an image pickup unit 110 and an indication unit 120.

Referring to FIG. 4, the indication unit 120 may be configured in the form of a module that surrounds the image pickup unit 110. For example, the indication unit 120 may be configured in the form of a doughnut, in which the image pickup unit 110 is disposed at the center of the indication unit 120.

That is, the indication unit 120 may be formed in a circular shape while surrounding the image pickup unit 110.

In the embodiment of FIG. 4, the indication unit 120, which is formed in the shape of a single module, may include a plurality of light emitting modules 20a, 20b, 20c, and 20d.

In addition, each of the light emitting modules 20a, 20b, 20c, and 20d included in the indication unit 120 may have a separate driving unit (not shown).

In the embodiment of FIG. 4, the indication unit 120 may include four light emitting modules 20a to 20d, and the four light emitting modules 20a to 20d may be disposed above, under, on the left side of, and on the right side of the image pickup unit 110, respectively.

The light emitting modules 20a to 20d may emit beams having the same wavelength, or may emit beams having different wavelengths.

In addition, the light emitting modules 20a to 20d may be driven individually, or the light emitting modules 20a to 20d may be driven simultaneously.

When the light emitting modules 20a to 20d, included in the indication unit 120, are disposed above, under, on the left side of, and on the right side of the image pickup unit 110, respectively, the light emitting modules 20a and 20c, which are disposed above and under the image pickup unit 110, respectively, may be disposed so as to be opposite each other on the basis of the image pickup unit 110.

In addition, the light emitting modules 20b and 20d, which are disposed on the left and right sides of the image pickup unit 110, respectively, may also be disposed so as to be opposite each other on the basis of the image pickup unit 110.

In the embodiment of FIG. 4, the light emitting modules 20a to 20d are shown as being disposed above, under, on the left side of, and on the right side of the image pickup unit 110, respectively. However, the disclosure is not limited thereto. The light emitting modules 20a to 20d may be disposed diagonally so as to surround the image pickup unit 110.

In addition, four light emitting modules are shown as being disposed in FIG. 4. However, the number of light emitting modules is not limited thereto. For example, four or more light emitting modules may be disposed so as to surround the image pickup unit 110.

In the embodiments of FIGS. 3 and 4, each light emitting module 20 may be configured in the form of a light emitting diode, a light emitting diode package having a light emitting diode fixed to a body, or a light emitting diode package having a lens formed thereon.

However, the form of the light emitting module 2.0 is not limited thereto. The light emitting module may include a lead frame, or may further include a support board.

Figure 5:
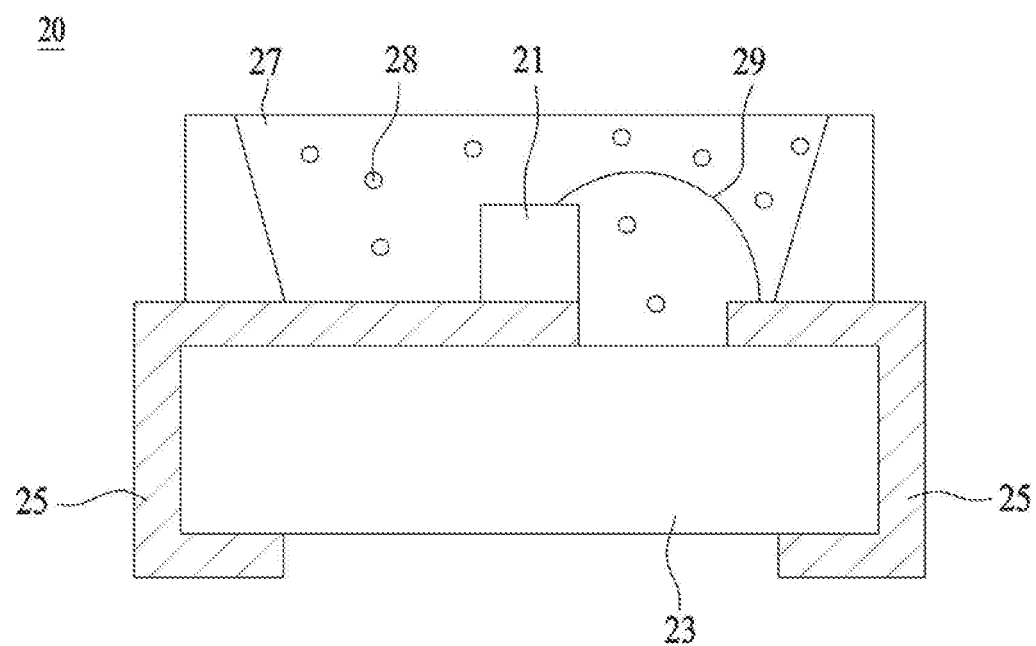
FIG. 5 is a view showing an embodiment of a light emitting module.

FIG. 5 is a view showing an embodiment of the light emitting module 20. In this embodiment, the light emitting module 20 may include a body 23, a cavity 27 formed on the body, and a light emitting diode 21 disposed in the cavity. The body may include a lead frame 25 for electrical connection with the light emitting diode.

The body 23 may include a silicon material, a synthetic resin material, or a metal material. The cavity 27, the upper part of which is open and which has a side surface and a bottom surface, may be provided on the body.

The body 223 may include at least one lead frame 25, via which the body is electrically connected to the light emitting diode.

At least one light emitting diode may be disposed on the bottom surface of the cavity 27.

A molding part, which wraps the light emitting diode 21, may be disposed in the cavity 27 of the light emitting module. The molding part may include a resin layer and fluorescent materials 28.

The light emitting diode 21 may include a first conductive semiconductor layer, an active layer, and a second conductive semiconductor layer. The wavelength of the emitted light may be changed depending on the construction of the semiconductor layers.

For example, the light emitting diode 21 may emit blue light. In the case in which the molding part is provided in the cavity 27 and the molding part includes fluorescent materials 28, the wavelength of the light that is emitted by the light emitting module 20 may be changed depending on the kind of the fluorescent materials.

For example, the light emitting module 20 may emit light having a red wavelength, a yellow wavelength, or a white wavelength depending on the light emitting diode and the fluorescent materials, which are excited by the light emitted by the light emitting diode such that the wavelength of the fluorescent materials is changed.

Figure 6:
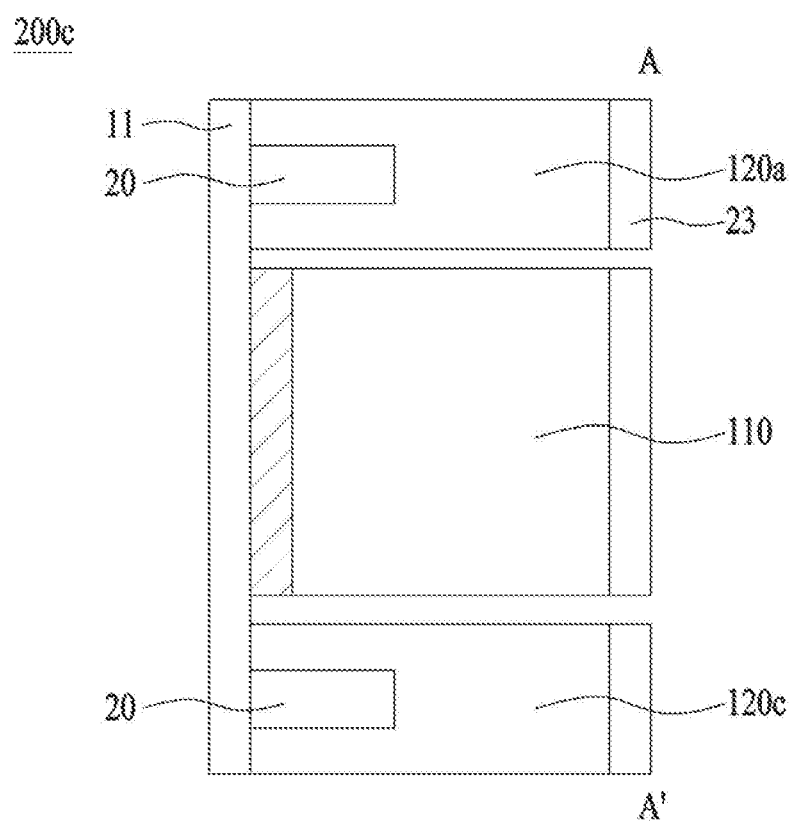
FIG. 6 is a view showing an embodiment of an iris recognition camera system.

FIG. 6 is a sectional view of the iris recognition camera system.

FIG. 6 may be a sectional view taken along line A-A' of FIG. 3.

Referring to FIG. 6, each of the indication units 120a and 120c, which surround the image pickup unit 110, may include a light emitting module 20, a board 11 for supporting the light emitting module, and a front cover 23 for protecting the light emitting module.

The board 11 may be a printed circuit board (PCB) for driving the light emitting module. The board 11 may be electrically connected to the light emitting module 20, and may be connected to an external electrode.

For example, the PCB may be a hard type PCB for supporting the light emitting module 20. However, the disclosure is not limited thereto. The PCB may be a flexible type PCB.

The front cover 23 may be made of a transparent plastic or glass material. However, the disclosure is not limited thereto. A diffusion plate may be further provided to make the light emitted by the light emitting module 20 uniform.

Although the indication units are disposed as shown in FIGS. 3, 4, and 6, the disposition and number of indication units in the iris recognition camera system are not limited thereto. Indication units having various shapes may be disposed.

In addition, the number of indication units may be greater or less than the number of indication units shown in the drawings, and the indication units may have the same area or different areas.

The iris recognition camera system 200 of FIG. 1 may include a calculation unit 140 for analyzing the photographed iris image generated by the image pickup unit 110.

The iris image taken by the image pickup unit 110 may be converted into an electrical signal by the image sensor, and may be transmitted to the calculation unit 140.

The calculation unit 140 may analyze the position of the image sensor on which the generated photographed iris image is formed.

The calculation unit 140 analyzing the position of the photographed iris image may analyze whether the photographed iris image is located in a reference zone of the image sensor.

The reference zone may be changed depending on the sensitivity and performance of the iris recognition camera system. For example, the reference zone may be an optical field zone including the center of the image sensor when dividing optical fields of the image sensor.

The position value of the photographed iris image analyzed by the calculation unit 140 may be transmitted to the controller 150.

The controller 150 may transmit a driving signal to the indication unit 120.

The controller 150 may control the driving of at least one indication unit 120 based on the value output from the calculation unit 140.

The controller 150 may be connected to the driving unit of the light emitting module included in the indication unit 120.

In addition, the controller 150 may operate at least one of the light emitting modules included in the indication unit 120 based on the analysis result value of the calculation unit 140. In addition, in the case in which the iris recognition camera system 200 includes a plurality of indication units 120, the controller may operate a light emitting module included in at least one of the indication units 120.

In the case in which the photographed iris image is analyzed as being offset from the reference zone of the image sensor, the controller 150 may transmit a signal for driving the indication unit 120 based on the analysis result value.

For example, the controller 150 may analyze the direction in which the iris image is offset from the reference zone, and may control driving of the indication unit 120 to indicate the movement direction of the iris image.

In addition, in the case in which the photographed iris image is analyzed as being located in the reference zone of the image sensor, the controller 150 may transmit a signal for driving the indication unit 120 based thereon.

For example, the controller 150 may perform control such that the indication unit 120 blinks to indicate that the iris image is located in the reference zone.

The iris recognition camera system 200 may include an image extraction unit 160.

The image extraction unit 160 may extract an authenticated iris image.

The authenticated iris image, which is the final iris image used for iris recognition, may be located in the reference zone of the photographed iris image.

That is, in the case in which the photographed iris image is analyzed as being located in the reference zone of the image sensor, the calculation unit 140 may transmit a signal to the image extraction unit 160.

The image extraction unit 160 may capture and enlarge the photographed iris image located in the reference zone so as to be used as an authenticated iris image for iris recognition. The image extraction unit 160 may store the captured authenticated iris image.

The iris recognition camera system 200 according to the embodiment may include a memory unit 170 for storing a reference iris image.

The reference iris image may be an iris image of a user which is authenticated using the iris recognition camera system. Alternatively, the reference iris image may be a data-based specific pattern of the stored iris image.

For example, the reference iris image may be data obtained by analyzing a specific pattern of an iris of a user.

Hereinafter, an iris recognition method using the iris recognition camera system 200 and a mobile terminal including the iris recognition camera system 200 will be described with reference to the accompanying drawings. However, the disclosure is not limited thereto. The iris recognition camera system according to the embodiment may be variously used to photograph an iris.

Figure 7:
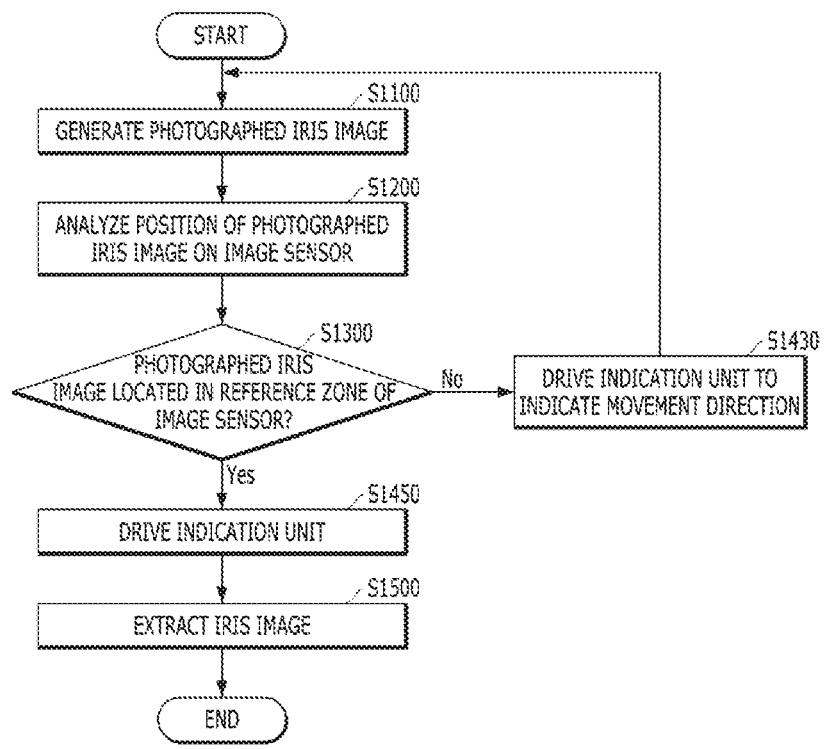
FIG. 7 is a flowchart showing an embodiment of an iris recognition method.

FIG. 7 is a flowchart showing an embodiment of the iris recognition method.

The iris recognition method using the iris recognition camera system of the above embodiment may include a step (S1100) of generating a photographed iris image, a step (S1200) of analyzing the position of the photographed iris image on the image sensor, and steps (S1430 and S1450) of driving the indication unit based on the analyzed position result value.

In the iris recognition method according to the embodiment, the step (S1100) of generating the photographed iris image may include a step of photographing an iris to acquire optical information and an image information processing step of converting the acquired optical information into an electrical signal.

The step of photographing the iris to acquire the optical information may be a step of generating an optical signal of the iris image through the image pickup unit of the iris recognition camera system.

In addition, the image information processing step may be a step of receiving the optical signal generated from the photographed iris and converting the optical signal into an electrical signal through the image sensor. The image sensor may convert the optical signal into an electrical signal to acquire a photographed iris image.

In the embodiment of the iris recognition method, the step (S1200) of analyzing the position of the generated photographed iris image on the image sensor may be a step of calculating the position of the photographed iris image on the image sensor.

In addition, the step (S1200) of analyzing the position of the photographed iris image on the image sensor may include a step (S1300) of determining whether the photographed iris image is located in the reference zone of the image sensor.

The step (S1200) of analyzing the position of the photographed iris image on the image sensor may be a step of determining where the photographed iris image is located on the basis of the reference zone of the image sensor, and may include a step (S1300) of determining whether the photographed iris image is formed in the reference zone of the image sensor.

In the iris recognition method according to the embodiment, the step (S1200) of analyzing the position of the photographed iris image on the image sensor may be performed by the calculation unit of the iris recognition camera system.

The calculation unit may analyze and determine the position of the photographed iris image, and may confirm the movement direction of the iris based on the result value. In addition, a signal indicating the result value of the determination as to whether the photographed iris image is located in the reference zone of the image sensor may be transmitted to the indication unit such that the indication unit is driven.

Meanwhile, whether the acquired iris image is located in the reference zone of the image sensor may be determined by dividing the image sensor into imaginary zones.

The reference zone may be an imaginary optical field including the center of the image sensor.

For example, the reference zone of the image sensor, based on which the relative position of the iris image is confirmed, may be an optical field configured in a circle that is concentric with the center of the image sensor.

Figure 8:
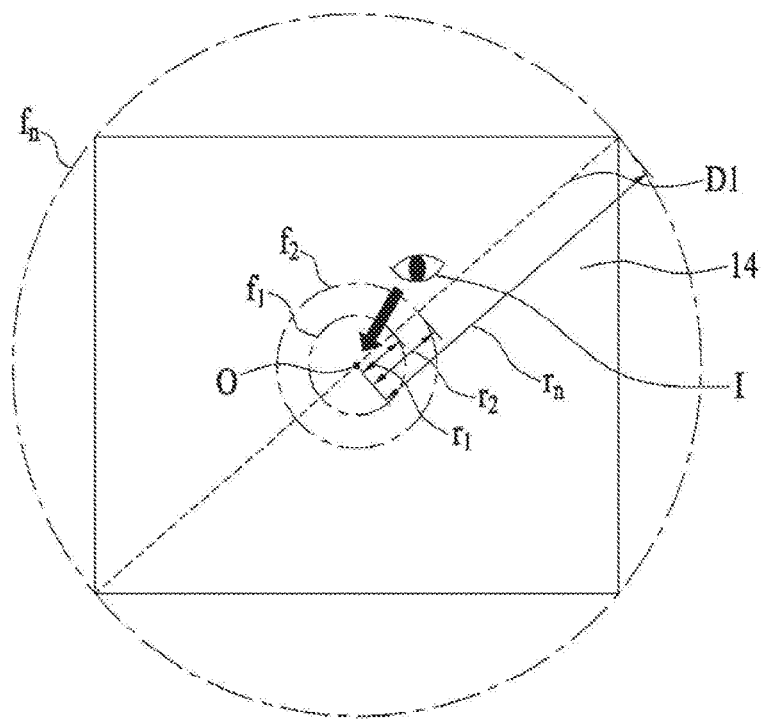
FIG. 8 is a view showing an example in which an iris image is formed on an image sensor.

FIG. 8 is a view showing an embodiment of the image sensor on which the photographed iris image is formed.

Referring to FIG. 8, the image sensor 14 of the embodiment may be divided into n optical fields $f_1, f_2, \ldots,$ and $f_n$. Imaginary circles that divide the n optical fields may be circles that are concentric with the center O of the image sensor.

When the diagonal line D1 of the image sensor is divided at predetermined intervals, each imaginary zone of the image sensor 14, i.e. each optical field, may be a zone defined by an imaginary concentric circle having the distance between two points on the diagonal line that are symmetrical with each other with respect to the center O of the image sensor as the diameter.

For example, the first optical field $f_1$ may be the interior of an imaginary circle having the distance to a point that is spaced apart from the center O of the image sensor by r1 as the radius.

In addition, the second optical field $f_2$ may be the interior of an imaginary circle having the distance to a point that is spaced apart from the center O of the image sensor by r2 as the radius, excluding the interior of the imaginary circle corresponding to the first optical field $f_1$.

The divided number of optical fields may be changed depending on the size of the image sensor and how an image acquired through the image sensor is to be used.

For example, in the case in which the image sensor is divided into 10 optical fields, it may be determined that the iris image is located in the reference zone of the image sensor when the iris image is formed in the first optical field $f_1$.

In contrast, it may be determined that the iris image is not formed in the reference zone of the image sensor in the case in which the iris image deviates from the reference zone, i.e. the first optical field $f_1$. In addition, it may be determined in which direction the iris image deviates from the first optical field $f_1$ on the basis of the center of the image sensor.

In addition, in the case in which the photographed iris image is located in the reference zone, the iris center of the photographed iris image I may be aligned with the center O of the image sensor.

In FIG. 8, the iris image I deviates from the first optical field f1 and is formed on the right upper side of the center O of the image sensor. In order to acquire an accurate iris image, therefore, the position of the eye must be moved further leftward and downward than the current position at which the iris image is acquired.

For example, it may be necessary to move the iris in the direction in which the center of the iris image I is aligned with the center O of the image sensor.

The iris recognition method according to the embodiment may include steps (S1430 and S1450) of driving the indication unit based on the analysis of the position of the acquired iris image as described above.

In the case in which it is analyzed that the photographed iris image deviates from the reference zone of the image sensor, the procedure may advance to the step (S1430) of driving the indication unit to indicate the movement direction.

The step (S1430) of driving the indication unit to indicate the movement direction may be a step of driving the indication unit of the iris recognition camera system to enable a user to recognize the movement direction.

Figure 9:
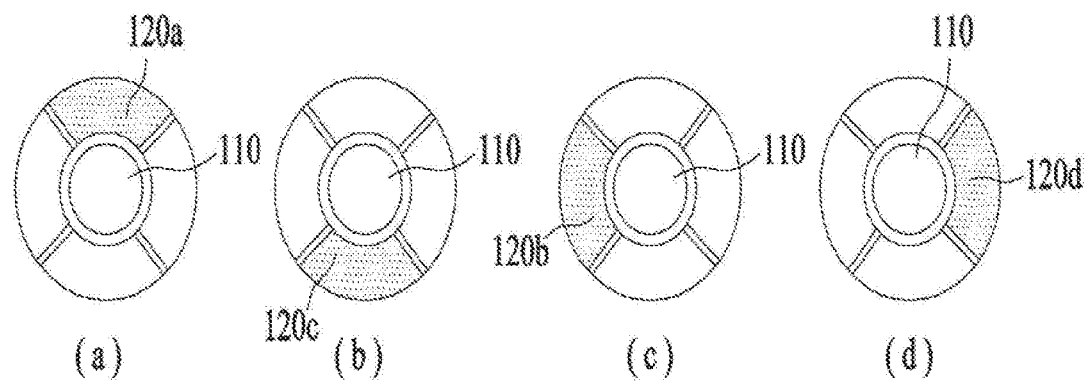
FIG. 9 is a view showing an embodiment of driving an indication unit.

For example, FIG. 9 is a view showing an embodiment in which an iris movement direction is presented in an iris recognition method using an iris recognition camera system having four indication units 120a, 120b, 120c, and 120d.

FIG. 9(a) shows the case in which the indication unit 120a, which is disposed above the image pickup unit 110, is driven. FIG. 9(a) shows the case in which the generated photographed iris image is located at the lower end of the reference zone of the image sensor. At the step (S1430) of driving the indication unit to indicate the movement direction, the indication unit 120a, which is disposed above the image pickup unit 110, may be driven to move the iris upward.

In the same manner, FIGS. 9(b), 9(c), and 9(d) may show steps of driving the indication units to move the iris downward, leftward, and rightward, respectively.

In addition, although not shown, the indication units may be driven simultaneously based on the position analysis result of the acquired iris image.

For example, in the case in which the acquired iris image deviates from the reference zone of the image sensor and is formed on the right upper side of the center of the image sensor, as shown in FIG. 8, the indication units 120b and 120c, which are disposed on the left side of and under the image pickup unit 110, respectively, may be driven simultaneously in order to enable the user to recognize that it is necessary to move the iris leftward and downward.

However, the method of driving the indication units described with reference to FIG. 9 is not limited thereto. The driving method may be changed depending on the number of indication units disposed around the image pickup unit 110 and the shape of the indication units.

In addition, the method of driving the indication units may be changed depending on the algorithm used in the iris recognition method according to the embodiment. For example, at least one indication unit may be driven to indicate the position of the photographed iris image relative to the reference zone, rather than the movement direction of the iris.

When the indication unit indicates the movement direction of the iris, the user may move the iris in the indicated direction, and then the step (S1100) of generating the photographed iris image through the image pickup unit may be performed again.

In contrast, upon determining that the generated photographed iris image is located in the reference zone of the image sensor, a step (S1500) of extracting the formed iris image as an authenticated iris image may be performed.

In addition, a step of comparing the authenticated iris image with a reference iris image stored in the memory unit of the iris recognition camera system may be performed.

The step of extracting the authenticated iris image may be a step of extracting a characteristic iris pattern from the acquired iris image as data using an image processing technique. The step of comparing the authenticated iris image with the reference iris image may be a step of comparing the extracted authenticated iris image data with the pattern data of the reference iris, which is registered in advance in order to authenticate a user.

Meanwhile, the step (S1450) of driving the indication unit upon determining that the photographed iris image is located in the reference zone may be a step of driving at least one indication unit so as to blink.

For example, the step (S1450) of driving the indication unit may be a step of driving all of the indication units disposed around the image pickup unit so as to blink or driving the indication units for a predetermined time in order to inform the user that the pupil of the eye is located in the reference zone and the final iris image for authentication will be acquired.

In addition, the step of driving the indication unit so as to blink may be a step of supplying light to the iris before extracting the authenticated iris image in order to prevent the red eye effect during iris photographing.

For example, in the embodiment, all of the indication units may be driven so as to blink, or the indication units may be driven for a predetermined time, in order to inform the user that the final iris image will be acquired. However, the disclosure is not limited thereto. A pre-stored photography notification sound may be output in order to inform the user that the final iris image will be acquired.

In the iris recognition camera system according to the embodiment and the iris recognition method using the same, the relative position of the iris image may be recognized based on the operation of the indication unit without checking the photographed iris image through a separate display device. Consequently, the movement direction of the iris may be presented to the user, whereby the iris image may be easily and accurately acquired for iris recognition.

A terminal according to an embodiment may include the iris recognition camera system according to the embodiment described above.

The iris recognition camera system may be disposed at the front surface or the rear surface of the terminal.

For example, the terminal including the iris recognition camera system may be a mobile terminal. However, the disclosure is not limited thereto. The iris recognition camera system according to the embodiment described above may be provided for a stationary terminal.

Figure 10:
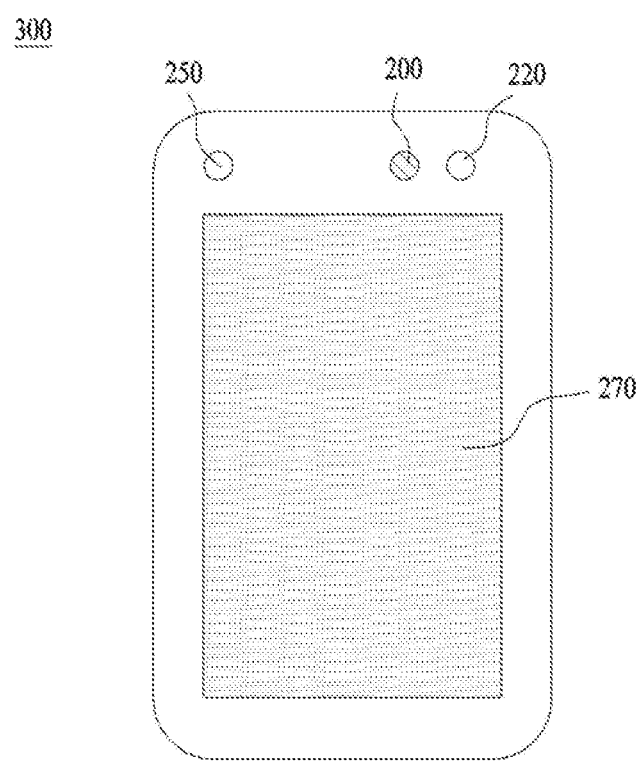
FIG. 10 is a view showing an embodiment of a mobile terminal.

FIG. 10 is a front view schematically showing a mobile terminal according to an embodiment.

The mobile terminal 300 may further include a camera system 220 for general image photographing, in addition to the iris recognition camera system 200 according to the embodiment described above.

In addition, the mobile terminal may further include an infrared light emitting module 250 as a lighting module for iris photographing.

The infrared light emitting module 250 may include a light emitting diode for emitting light having an infrared wavelength.

The iris image acquired using the iris recognition camera system 200 may be displayed on a display unit 270 of the mobile terminal.

In addition, the iris image acquired using the iris recognition camera system 200 may be provided so as to be used for other functions of the mobile terminal. For example, the iris image may be used for a security system of the mobile terminal. However, the disclosure is not limited thereto.

In iris recognition using the mobile terminal, data information about the reference iris image may be stored in a memory of the mobile terminal.

Since the mobile terminal according to the embodiment includes the iris recognition camera system, a security system based on iris recognition may be used in the mobile terminal, and the position of the iris may be easily recognized by driving the indication unit, thereby achieving accurate and rapid iris authentication.

Although embodiments have been described with reference to a number of illustrative embodiments thereof, it should be understood that numerous other modifications and applications may be devised by those skilled in the art that will fall within the intrinsic aspects of the embodiments. For example, various variations and modifications are possible in concrete constituent elements of the embodiments. In addition, it is to be understood that differences relevant to the variations and modifications fall within the spirit and scope of the present disclosure defined in the appended claims.

INDUSTRIAL APPLICABILITY

An iris recognition camera system and an iris recognition method using the same according to embodiments may be used for iris recognition.

The invention claimed is:

1. An iris recognition camera system comprising:
an image acquirer comprising an image sensor;
a plurality of displays disposed around the image acquirer;
an analyzer configured to analyze a position of a captured iris image generated by the image acquirer on the image sensor; and
a controller configured to control driving of the displays based on a result value output from the analyzer;
wherein the image acquirer is disposed at a central region, the plurality of displays surrounds the image acquirer, and the displays are disposed apart from each other on an outer periphery of the image acquirer,
wherein each of the displays comprises a plurality of light emitting modules, and
wherein each of the light emitting modules is separately driven.

2. The iris recognition camera system according to claim 1, wherein the displays are disposed above, under, on a left side of, and on a right side of the image acquirer so as to surround the image acquirer.

3. The iris recognition camera system according to claim 2, wherein
the displays disposed above and under the image acquirer are symmetrical with each other with respect to the image acquirer, and the displays disposed on the left and right sides of the image acquirer are symmetrical with each other with respect to the image acquirer.

4. The iris recognition camera system according to claim 1, wherein the light emitting modules are disposed above, under, on a left side of, and on a right side of the image acquirer so as to surround the image acquirer.

5. The iris recognition camera system according to claim 1, comprising an image extractor configured to extract an authenticated iris image.

6. The iris recognition camera system according to claim 5, further comprising a memory configured to store a reference iris image.

7. An iris recognition method comprising:
generating a captured iris image by an image acquirer comprising an image sensor;
analyzing a position of the captured iris image on the image sensor by an analyzer; and
driving a display based on a result value of the analyzed position of the captured iris image by a controller,
wherein the analyzing the position of the captured iris image on the image sensor comprises determining whether the captured iris image is formed in a reference zone of the image sensor, and
wherein the reference zone is an imaginary optical field zone comprising a center of the image sensor.

8. The iris recognition method according to claim 7, wherein the driving the display in a case in which the captured iris image deviates from the reference zone comprises indicating a movement direction of the iris.

9. The iris recognition method according to claim 7, comprising extracting the captured iris image as the authenticated iris image in a case in which the captured iris image is located in the reference zone.

10. The iris recognition method according to claim 9, wherein an iris center of the captured iris image is aligned with a center of the image sensor in the case in which the captured iris image is located in the reference zone.

11. The iris recognition method according to claim 9, comprising comparing the authenticated iris image with the reference iris image.

12. The iris recognition method according to claim 9, wherein the driving the display comprises driving the display so as to blink.

13. A terminal comprising:
an image acquirer comprising an image sensor;
a plurality of displays disposed around the image acquirer;
an analyzer configured to analyze a position of a captured iris image generated by the image acquirer on the image sensor; and
a controller configured to control driving of the plurality of displays based on a result value output from the analyzer;
wherein the image acquirer is disposed at a central region, the displays surround the image acquirer, and the plurality of displays are disposed apart from each other on the outer periphery of the image acquirer,
wherein each of the displays comprises a plurality of light emitting modules, and
wherein each of the light emitting modules is separately driven.

14. The terminal according to claim 13, wherein the displays are disposed above, under, on a left side of, and on a right side of the image acquirer so as to surround the image acquirer.

* * * * *